R. GRIFFITH.
ART OF MANUFACTURING WATER BOTTLES AND THE LIKE.
APPLICATION FILED JULY 10, 1915.
1,317,442.
Patented Sept. 30, 1919.
2 SHEETS—SHEET 1.
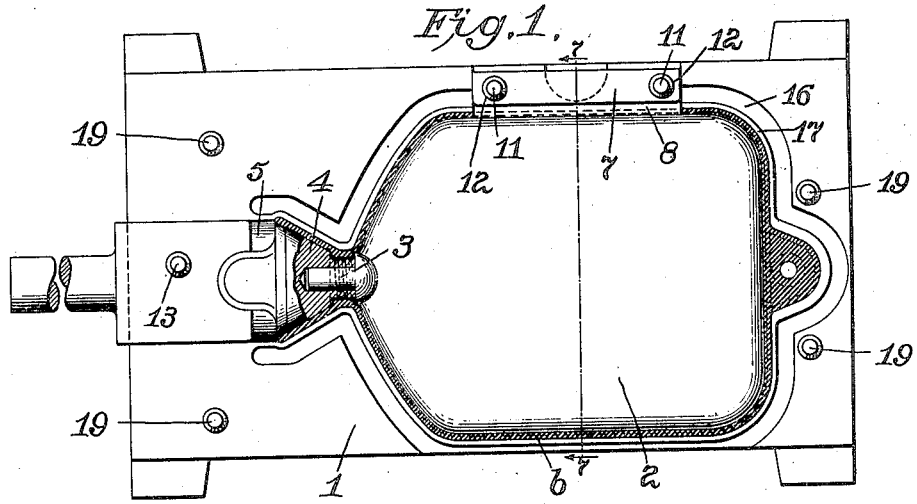
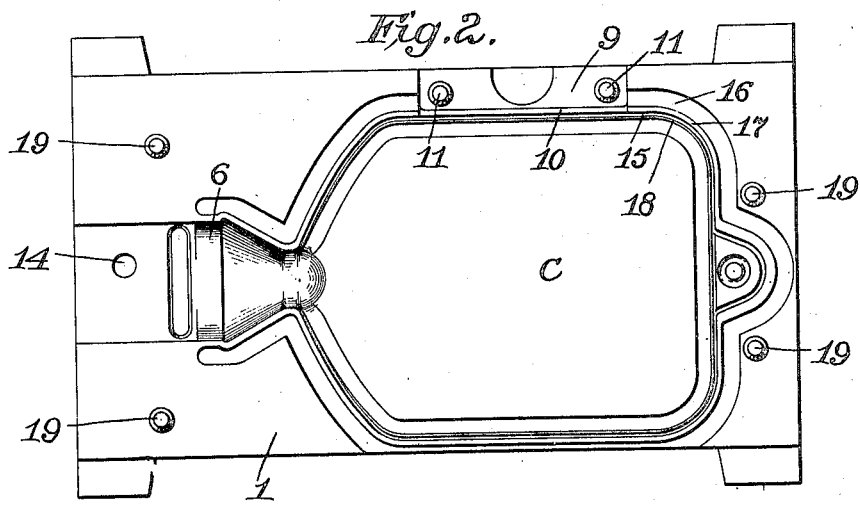
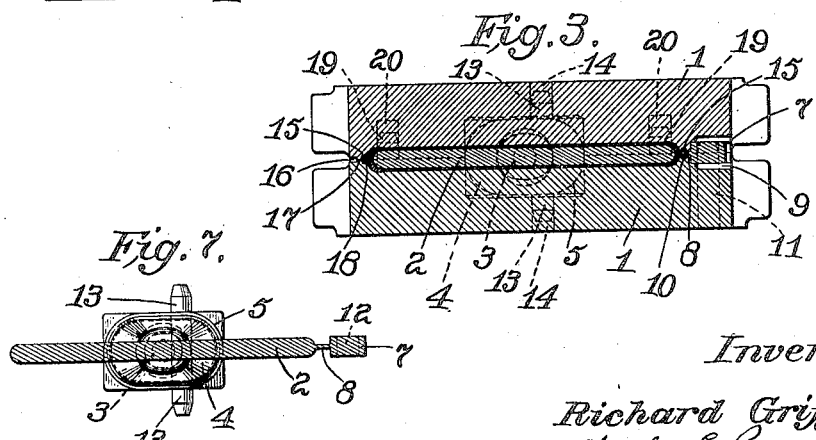
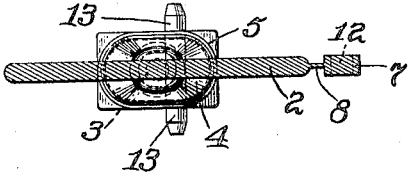
Inventor.
Richard Griffith,
by Charles E Parsons Atty.

R. GRIFFITH.
ART OF MANUFACTURING WATER BOTTLES AND THE LIKE.
APPLICATION FILED JULY 10, 1915.

1,317,442.

Patented Sept. 30, 1919.
2 SHEETS—SHEET 2.

Inventor:
Richard Griffith,
by Charles E. Pawens
Atty.

UNITED STATES PATENT OFFICE.

RICHARD GRIFFITH, OF AKRON, OHIO, ASSIGNOR TO MILLER RUBBER CO., OF AKRON, OHIO, A CORPORATION OF OHIO.

ART OF MANUFACTURING WATER-BOTTLES AND THE LIKE.

1,317,442.   Specification of Letters Patent.   Patented Sept. 30, 1919.

Application filed July 10, 1915. Serial No. 39,120.

*To all whom it may concern:*

Be it known that RICHARD GRIFFITH, a citizen of the United States, residing at Akron, in the county of Summit and State of Ohio, has invented certain new and useful Improvements in the Art of Manufacturing Water-Bottles and the like, of which the following is a specification.

The present invention relates to the manufacture of hot water bottles, and hollow articles of a similar nature and pertains more particularly to the kind of rubber bottles or containers which are formed in a mold about a core, the core subsequently withdrawn through an opening and the opening finally sealed so as to prevent leakage from the bottle. Fluid containers of this type are usually referred to as seamless containers, and present many advantages, in both appearance and utility, over the former types of bags or bottles composed of two separate halves and united together at their edges by seams and the like.

The difficulty in forming a bottle according to the present method has always been the trouble experienced in withdrawing the core from the interior of the bottle. Numerous expedients have been tried to overcome this drawback, such as forming the core in sections and withdrawing it piece by piece, through the neck of the bottle. It has also been suggested to form the bottle in a mold about a core, so as to leave an opening across the lower end of the bottle through which the core is withdrawn. The difficulty with this method is that a metal insert has to be placed in the opening or a separate inflap of rubber vulcanized therein in order to completely seal the bottle so as to prevent any leakage. The use of a metal insert has not proved satisfactory, and the addition of a separate rubber flap vulcanized in at the end of the bottle greatly mars the appearance of the finished article.

It is the object of the present invention to provide a method for forming seamless hot water bottles of the class described in such manner as to overcome the difficulties heretofore experienced and at the same time quickly, economically and efficiently produce a bottle which will be neat in appearance as well as serviceable for the purpose for which it is intended.

The invention contemplates the method of forming a hot water bottle of rubber by vulcanizing the body and filling funnel of the bottle as a unitary article around a suitable core or mandrel in a mold, forming at the same time an opening in the side wall of the bottle through which the core is withdrawn from the interior of the bottle body and then vulcanizing the edges of the opening together in such manner as to present a seamless wall throughout the edge of the bottle.

An important object in this method of forming the bottle is to provide at the time of molding the bottle an opening in the side which may be comparatively small, and which because of its location can be easily stretched to one and one-half times its original size, thus permitting the release of a larger core or mandrel than in any other known form. The location of the side opening is such that by simply grasping the neck of the bottle in the left hand and the tail in the right and pulling, the bottle can be stretched lengthwise and the opening greatly enlarged.

A further important advantage sought by the present method of forming a hot water bottle is the easy and effective manner in which the side opening is closed after the withdrawal of the core. This object is attained by forming a bead completely around the edge of the water bottle and having the edges of the opening provided with sufficient excess stock or bead material, then pressing the two edges of this bead together and heating the parts under pressure so that the excess stock will amalgamate the two edges into one homogeneous piece, sealing the opening strongly and perfectly.

The invention further contemplates the provision of suitable apparatus adapted to be used in forming a bottle according to the method above outlined.

In the drawings:

Figure 1 is a plan view of the mold with the core in place, parts being shown in section.

Fig. 2 is a plan view of one of the mold parts.

Fig. 3 is a transverse section showing the assembled parts of the mold with a bottle on the core in the process of manufacture.

Fig. 7 is a detail sectional view on the line 7—7 of Fig. 1.

Figure 4:
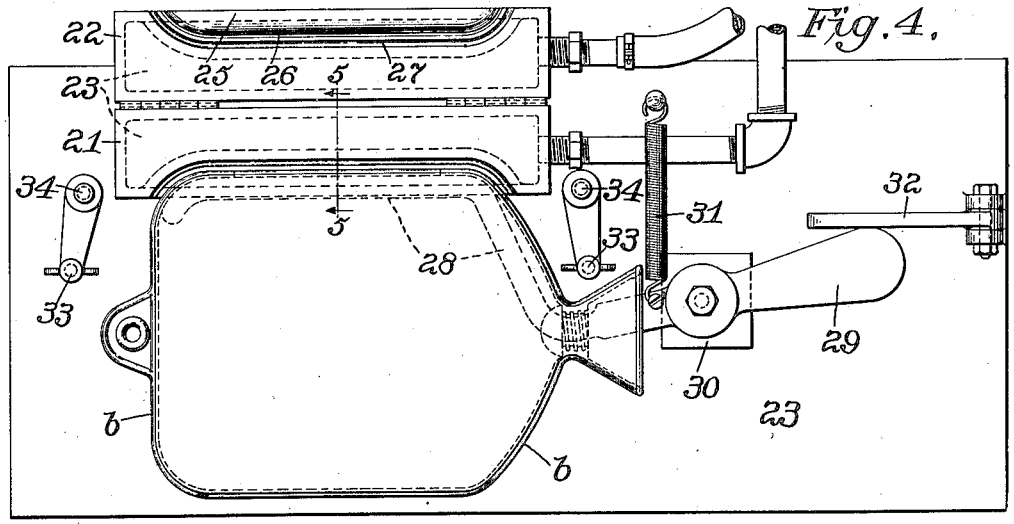
Fig. 4 is a plan view of the vulcanizing mold or apparatus employed for sealing the opening at the side of the bottle with the parts of the mold in open position.

Referring to the drawings, the forming mold is composed of two parts 1, 1, which collectively provide a molding or forming cavity of the size and shape of the finished bag or bottle. As shown, each of these mold members is formed with a cavity C corresponding in size and shape to half of the water bag. Between these two mold members there is provided a core which comprises a body 2 having an extension 3, by which the core is supported and positioned at one end in the mold by engagement with the inner end of a conical tapering extension 4, of an oval shaped head 5 extending within a correspondingly shaped cavity 6 between the mold members. The core 2 is further provided with an extension or flange 7 at one side thereof. The flange or extension 7 is of equal thickness with the core 2 and is joined thereto by a narrow integral web 8, as will be seen from the cross sectional view shown in Fig. 3. The flange or extension 7 is parallel with the side of the core 2 and extends in length a distance considerably less than the width of the latter. The two mold members 1, 1 have suitably formed recesses 9, separated from the main cavity C, by partitions 10, adapted to receive, when the parts are assembled, the extension or flange 7 of the core. The partitions 10 are slightly less in height than half the thickness of the core 2 or its extension 7 so that their outer edges will firmly contact with the web 8 when the parts are assembled and the flange 7 is clamped within the recesses 9 between the two mold members 1, 1. Pins 11 formed on the mold members 1, 1 engage with perforations 12 in the extension 7, thus serving to form an additional support for the core 2, when the same is positioned between the two members of the forming mold.

The oval shaped head 5 is also provided with circular pins 13 adapted to engage in suitable recesses 14, formed in the mold members 1, 1 for the purpose of properly supporting and positioning the conical end 4 into which the extension 3 of the core 2 is inserted.

The hollow portions or cavities C of the forming members are of a depth sufficient to provide a space between their inner surfaces and the exterior of the core 2, when the parts are assembled, equal to the width or thickness of the sides or walls of the bottle.

At the upper edge of the walls of the hollow portions or cavities C of each mold member 2, grooves 15 and 16 are provided, extending around the perimeters of the molds. The inner groove 15 is separated from the outer groove 16 by a small flange or bead 17 formed integral with the main mold casting 1.

The inner groove 15 is separated from the cavity C by a narrow rim 18 formed at the upper edge of the outer wall of the main hollow portion of the mold. This rim 18 is slightly lower than the outer surface of the partition 17. The partition 17 is leveled off at the side of the mold, where the extension or flange 7 of the core 2 is adapted to come. The side wall of the mold 1 is gradually inclined upwardly and outwardly from the bottom of the cavity C to the upper edge where it terminates in the rim 18. The purpose of this will be seen by referring to Fig. 5. It is the object of this invention to form a hot water bag or bottle having a bead $b$ extending completely around its outer edge. The grooves 15 of the mold members 1 serve this purpose. The outer grooves 16 are provided to take up the excess material that overflows when the two mold halves are clamped together during the vulcanizing process.

It is particularly desirous that the side walls of the bag be strongly reinforced at the point where the parts are vulcanized together and for this reason the outer wall of the mold curves slightly outwardly, so that the raw rubber, of which the bag is formed, will be thicker at the sides adjoining the bead $b$. In Fig. 3 it will be seen that the space between the outer surface of the core 2 and the inner surface of the cavity C is greater around the sides than at the bottom. When the rubber is being vulcanized in the mold, part of the excess from the bead $b$ in the groove 15 will flow out into the overflow groove 16 and the remainder will flow over the rim 18 and down into this space (above referred to) tending to thicken and strengthen the sides of the bag at this point.

From the foregoing detailed description of the mold parts and core, it is believed the process involved in forming the body and neck of the bag will be clearly understood.

The two mold halves 1 are heated and placed in open position. Pieces of raw unvulcanized rubber cut to correspond approximately in size and shape to the body and neck of the bag sought to be made, are then laid in each half. The oval shaped head 4 is then placed in the cavity 6 of one of the mold members 1, with the pin 13 inserted in the hole 14. The core 2 is then placed over the rubber in this mold with the extension 3 inserted in the conical extension 4 and the perforations 12 of the extension 7 over the pins 11. The other mold member 1 with its rubber piece in place, is then placed over the first one so that the pins 19 register with the holes 20 and prevent any displacement of the mold halves in relation to each other. The mold in its assembled form is then subjected to the necessary amount of heat and pressure to insure proper vulcanization of the rubber within. When this has been accomplished, the mold parts are separated and the core 2 removed with the bag formed thereon. When the core 2 is taken from the mold members 1, 1 it will be completely incased with an article presenting the form and appearance of the finished seamless bag or bottle with an even bead $b$ surrounding its entire perimeter. The only place where the body of the bag is not completely sealed and finished will be along the side where the extension or flange 7 came. An opening will be formed at this place corresponding exactly in length to the length of the part 7.

The bead $b$ will extend along the outer edges of this opening.

Now in order to remove the core 2 from within the bottle, it is only necessary to hold with the left hand the tail-piece of the bottle and with the right hand stretch the bottle at the neck enlarging the opening around the extension 7 at the side and with a side movement strip the core from within the bottle.

The only remaining step is the sealing up or vulcanizing the sides of the bottle along the edges of the opening.

Figure 5:
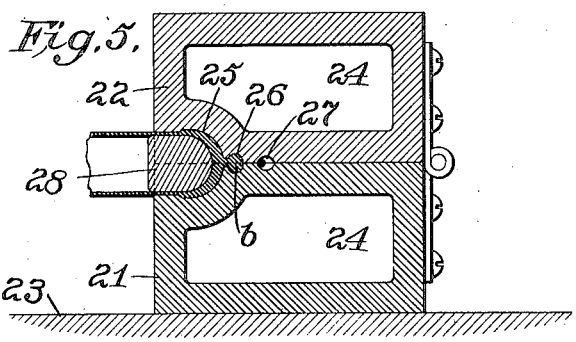
Fig. 5 is a transverse section of Fig. 4 taken on the line 5—5 with the mold parts in closed position.

The operation of closing the side opening in the bag is accomplished by means of separate molding apparatus illustrated in Figs. 4 and 5. The apparatus consists of two mold parts 21 and 22 hinged together, one of which, 21 is rigidly attached to a table or base 23. The mold members 21 and 22 are of a general rectangular shape and are each formed with a hollow steam or water jacket 24. They are each provided with similarly formed recesses or cavities 25, surrounded at their upper edges by grooves 26 and 27.

The cavities 25 with the grooves 26 and 27 are of a form corresponding in size and shape to a portion of the exterior of the finished bottle. They are so arranged in the mold members 21 and 22 that when the two members are in closed position, the cavities and grooves 25 and 27 of one member, will be superposed upon the corresponding parts of the other member. The cavities or recesses 25, 26 and 27 are so designed and proportioned as to receive that portion of the side of a vulcanized bottle adjacent to the opening through which the core in the previous step was withdrawn. A pivoted arm 28 provided with a handle 29 is suitably located on a block 30 on the base or table 23. The arm 28 is adapted to be inserted in the neck of the bottle and is so formed that after insertion, it will extend from the neck down along the inner side of the bottle adjacent to the side opening. The arm 28 is normally held in operative position by means of a coil spring 31. Additional fastening means consist in a small pivoted lever 32 adapted to engage the handle 29 and further insure the position of the arm 28 against accidental displacement.

To vulcanize the opening formed in the body of the bottle by the extension 7, liquid cement is first applied to the inner edges of the opening at the side of the bottle, the bottle is then placed on the arm 28 of the vulcanizing apparatus so that this arm will extend along the inside wall and serve as a temporary core or mold member. The arm 28 is then moved by means of its handle 29 over into position with the mold member 21 and the outer edge of the bottle is placed in the cavity 25 so that the bead $b$ registers with the groove 26. The handle 29 is then firmly locked in this position by means of the lever 32.

The upper half or mold member 22 is then closed about its edge and the two parts 21 and 22 are clamped together by means of a pair of vertically adjustable clamps 33, carried on the uprights 34. Steam or hot water is then sent through the steam jackets 24 of the members 21 and 22 and the vulcanization of the only heretofore unsealed part of the bag is accomplished.

The mold members 21 and 22 are then opened and the finished bag or bottle removed from the lever 28.

This method of closing the opening through which the core was removed enables the bead $b$ extending around the edge of the bottle to be formed without any apparent break or interruption so that the bottle presents a finished appearance with no means of detecting where or how the opening was closed.

By the present method of constructing the bottle, a more rigid anchorage for the core 2 is provided, while the parts are being vulcanized, than has heretofore been accomplished.

The ease and facility with which the core can be removed from within the bottle after vulcanization is an advantage of material importance, not only in the process of manufacture but also in effecting a sealing of the opening and improving the general appearance of the bottle.

Figure 6:
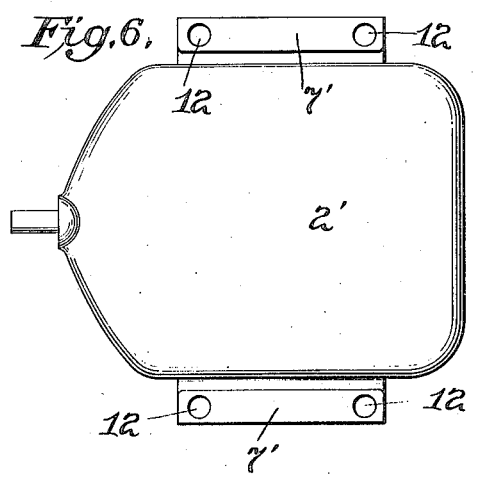
Fig. 6 is a plan of a modified form of core adapted to provide two openings in the sides of the bottle.

Fig. 6 represents a modified form of core adapted to be used in exactly same manner only provided with two extensions or flanges $7'$, one arranged on either side of the core $2'$. By forming a bottle with this form of core, a little more rigid anchorage is provided for the core during the vulcanizing stage.

While in the foregoing specification I have described the invention more particularly in connection with water bottles or bags it will be understood that it is not limited to the production of this specific article but is applicable to any rubber bag or container adapted to contain fluid and provided with a filling nozzle or funnel, and when the term "water bottle" is used it is intended to include any article of an analogous nature whether intended to be filled with water or other fluid, liquid or gaseous.

I claim as my invention:—

1. That improvement in the art of manufacturing fluid containers from rubber which consists in vulcanizing the body and filling extension of the container as a unitary article around a suitable core or mandrel in a mold, and simultaneously forming in the body portion of said container along the side an opening, and then removing the core or mandrel through said opening and then closing said opening.

2. That improvement in the art of manufacturing water bottles and the like from rubber, which consists in vulcanizing the body and filling-funnel of a water bottle as a unitary article around a suitable core or mandrel in a mold, and simultaneously forming in the body portion of said bottle along the side an opening, then removing the core or mandrel through said opening and subsequently sealing the opening through which the core or mandrel was withdrawn whereby leakage from said bottle is prevented.

3. That improvement in the art of manufacturing water bottles and the like from rubber, which consists in vulcanizing the body and filling-funnel of a water bottle as a unitary article around a suitable core or mandrel in a mold, simultaneously forming in the body portion of said bottle along the side an opening, then removing the core or mandrel through said opening and subsequently sealing the opening through which the core or mandrel was withdrawn by vulcanization, whereby leakage from said bottle is prevented.

4. That improvement in the art of manufacturing water bottles and the like from rubber which consists in vulcanizing the body and filling-funnel of a water bottle as a unitary article around a suitable core or mandrel in a mold and simultaneously forming in the body portion of said bottle along the side an opening, removing the core or mandrel through said opening then closing the side of the bottle having the opening formed therein in a second mold, and vulcanizing the edges of said opening together.

5. That improvement in the art of manufacturing water bottles and the like from rubber which consists in vulcanizing the body and filling-funnel of a water bottle as a unitary article around a suitable core or mandrel in a mold and simultaneously forming in the body portion of said bottle along the side an opening, removing the core or mandrel through said opening, inserting an arm member through the neck of said bottle and into engagement with the side wall adjacent said opening, inclosing the side of the bottle having the opening formed therein in a second mold and vulcanizing the edges of said opening together.

6. That improvement in the art of manufacturing water bottles and the like from rubber which consists in vulcanizing the body and filling-funnel of a water bottle as a unitary article around a suitable core or mandrel in a mold and simultaneously forming in the body portion of said bottle along the side an opening, removing the core or mandrel through said opening, inserting an arm member through the neck of said bottle and into engagement with the side wall adjacent said opening, applying a layer of cement or raw rubber along the inner side of said opening, inclosing the side of the bottle having the openings formed therein in a second mold and sealing said opening by vulcanization.

7. That improvement in the art of manufacturing water bottles and the like from rubber which consists in vulcanizing a body and filling funnel of a water bottle as a unitary article around a suitable core or mandrel in a mold and simultaneously forming in the body portion of said bottle along the side an opening, said opening being of a length less than the width of the core, removing the core or mandrel through said opening by stretching the bottle lengthwise and subsequently vulcanizing the edges of said opening together.

8. That improvement in the art of manufacturing water bottles and the like from rubber, which consists in vulcanizing the body and filling funnel of a water bottle as a unitary article around a suitable core or mandrel in a mold and simultaneously forming in the body portion of said bottle along the side an opening having an excess amount of stock distributed along its edges, then removing the core or mandrel through said opening and subsequently sealing said opening by vulcanizing its edges together under pressure.

9. That improvement in the art of manufacturing water bottles and the like from rubber which consists in vulcanizing the body and filling funnel of a water bottle as a unitary article around a suitable core or mandrel in a mold with a bead extending completely around its edge and simultaneously forming in the body portion of said bottle along the side an opening having an excess amount of stock distributed along its beaded edges, then removing the core or mandrel through said opening and subsequently sealing said opening by vulcanizing the beaded edges together in a mold under pressure utilizing the excess stock in the beaded edges of the opening as a reinforcing means for the closure.

10. The method of manufacturing hot water-bottles and similar articles, which consists in forming the same about a core in a mold, vulcanizing it in said mold, removing the core through an opening formed in a side wall of said bottle, and finally sealing said opening.

In testimony whereof I affix my signature in presence of two witnesses.

RICHARD GRIFFITH.

Witnesses:
  C. A. WOLF,
  HAROLD M. WILSON.